Patented Oct. 30, 1923.

1,472,675

UNITED STATES PATENT OFFICE.

MILTON C. REED, OF REEDS, MISSOURI.

FERTILIZER.

No Drawing. Application filed November 15, 1921. Serial No. 515,317.

*To all whom it may concern:*

Be it known that I, MILTON C. REED, a citizen of the United States, residing at Reeds, in the county of Jasper and State of Missouri, have invented certain new and useful Improvements in Fertilizers, of which the following is a specification.

This invention relates to fertilizers, and more particularly to fertilizers for trees, shrubbery, and plants of a woody nature.

An object of the invention is the production of a material having the double purpose of fertilizing the ground around the tree and destroying or driving away insects that live and exist in and about the roots of trees.

In the present invention, I employ a substance that will serve as an insecticide and will further serve to decompose certain other substances in the composition to produce fertilizing material.

The invention consists in a mixture containing the usual fertilizing agents such as potassium, sodium nitrate, and phosphates, together with tobacco dust, which serves primarily as an insecticide, and a substance capable of decomposing the tobacco dust to produce additional potassium.

The composition consists of an intimate mechanical mixture of sodium nitrate, potassium nitrate, phosphates, tobacco dust, hydrate of lime, sulfur, sodium chloride, concentrated lye, and wood ashes.

In the use of the fertilizer, the potassium, sodium nitrate, and phosphates act in the usual manner to supply the proper plant food. The sulfur is slowly oxidized in the presence of air and moisture to form sulfurous acid. The sulfurous acid formed changes slowly to sulfuric acid. Either of these acids will destroy the root aphis or its eggs, borers, white ants, and other insects or drive them away from the base of the tree. The sulfuric acid further serves to decompose the wood ash and tobacco dust, producing additional free potassium, which would otherwise not be available. The slow action of the oxygen and air and moisture contained therein with sulfur, combined with the low solubility of the materials upon which the sulfur reacts insures a fertilizer and insecticide which will last much longer than those containing only the essentials to soil fertilization As a typical example of the composition forming the subject matter of the present invention, the following ingredients are mechanically mixed in approximately the proportions stated:

| | Pounds. |
|---|---|
| Sodium nitrate 16% (19% ammonia) (Swift & Co., Nat'l Stock Yards. Ill.) | 12 |
| Potassium nitrate, 39% (Strassfurt Mines, Germany) | 12 |
| Missouri special phosphate (8% available phosphate, ½% nitrogen, 4% potash, 15% total phosphate, Read Phosphate Co., Nashville, Tenn.) | 12 |
| Tobacco dust, (9% potash) | 15 |
| Ash Grove hydrate of lime (Ash Grove, Mo.) | 15 |
| Sulfur sublimed heavy | 8 |
| Salt (sodium chloride) (Morton Salt Co., Kansas City, Mo.) | 5 |
| Eagle concentrated lye | 1 |
| Wood ashes | 20 |
| | 100 |

The analysis of the plant food is as follows:

| | Per cent. |
|---|---|
| Nitrogen | 1.97 |
| Available phosphoric acid | .96 |
| Potassium | 6.51 |

As stated, the potassium, sodium nitrate, and phosphates are employed in the usual manner to supply the proper plant food. The sulfurous and sulfuric acid produced serve as an insecticide and further serve to decompose the tobacco dust and wood ashes to produce free potash. Sulfuric acid also reacts on the hydrate of lime present to form calcium sulfate, a valuable constituent of a fertilizer.

The tobacco dust is used primarily as an insecticide and its secondary reaction with the sulfuric acid produces additional available potassium. The sodium chloride and lye are employed to destroy root lice, borers, white ants, white grub, and other insects. The sodium chloride, and lye are dissolved in the moisture present and sink down around the roots of the tree. They are not present in sufficiently large quantities to injure the tree but are present in the necessary proportion to drive out all insects around the base and roots of the tree. Being hydro-scopic, they tend to hold moisture near the roots of the tree during dry weather.

While the wood ashes are employed primarily for a filler, I have found that they contain approximately 1% of soluble potassium which is released by the sulfuric acid formed. The ash also causes the ground to be loose and fluffy, giving the soil a better vent and increasing the vitality of the tree. A tree treated with this substance maintains a smooth bark and fruit hangs on the tree much longer. By using the present composition and spraying the tree to kill insects in the usual manner, the tree and roots may be kept free from insect life.

The proportion of materials stated may be varied widely. For instance, where a greater percentage of fertilizer is desired and a smaller percentage of insecticide, the proportion of sodium nitrate, potassium nitrate, and phosphates may be increased. Similarly, where the difficulty with the tree resides primarily in the presence of insects, the proportion of sulfur, tobacco and other insecticides may be increased.

It is to be understood that while I have described in detail the preferred practice of my process, the details of procedure, and proportion of ingredients may be widely varied, and that known chemical equivalents may be employed in place of the materials mentioned, without departing from the spirit of the invention or the scope of the subjoined claims.

Having thus described my invention, I claim:

1. The herein described insecticide and fertilizer, comprising tobacco and sulfur.

2. The herein described insecticide and fertilizer, comprising tobacco, sodium nitrate, potassium nitrate, phosphate, calcium hydroxide, wood ashes and sulfur.

In testimony whereof I affix my signature in presence of two witnesses.

MILTON C. REED.

Witnesses:
CLARENCE CRAIG,
H. J. KRUGG.